(12) United States Patent
Teja et al.

(10) Patent No.: US 9,100,362 B2
(45) Date of Patent: Aug. 4, 2015

(54) PEER-TO-PEER ARCHITECTURE FOR WEB TRAFFIC MANAGEMENT

(75) Inventors: Aman Teja, Bangalore (IN); Vineeth Chandran, Bangalore (IN); Prashant R Kumar, Bangalore (IN); Sourav Chakraborty, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 621 days.

(21) Appl. No.: 13/543,119

(22) Filed: Jul. 6, 2012

(65) Prior Publication Data

US 2014/0012906 A1    Jan. 9, 2014

(51) Int. Cl.
*G06F 15/16*    (2006.01)
*H04L 29/08*    (2006.01)

(52) U.S. Cl.
CPC .............. *H04L 67/02* (2013.01); *H04L 67/104* (2013.01); *H04L 67/306* (2013.01)

(58) Field of Classification Search
CPC .............................. H04L 67/10; H04L 67/104
USPC .................................................... 709/204, 206
See application file for complete search history.

*Primary Examiner* — Glenford Madamba
(74) *Attorney, Agent, or Firm* — Hickman Palermo Bingham Becker LLP

(57) ABSTRACT

Techniques are provided for a peer-to-peer web traffic management. A first mapping between identifiers and peers in a network is established. Upon receiving a first request associated with a first identifier and classifiers, based, at least in part, on the first identifier, a first peer retrieves a first global counter snapshot and a first local increment counter, and uses them to determine whether the first peer can service the first request. If the determination is positive, then the first peer services the first request, and updates the first local increment counter. If the first local increment counter exceeded a threshold value, then the first local increment counter is transmitted to a second peer, and then reset to zero. In response to the first peer receiving a first global counter associated with the first global counter snapshot, the first global counter snapshot is updated with the first global counter.

23 Claims, 6 Drawing Sheets

PEER-TO-PEER ARCHITECTURE FOR WEB TRAFFIC MANAGEMENT

FIELD OF THE INVENTION

The present invention relates to web traffic management and, more specifically, to configuring peers to operate as an autonomous traffic management system.

BACKGROUND

A group of one or more networked servers located at a particular location is referred to herein as a "co-location." The servers at co-locations are often centrally managed. For example, for services that can be provided by servers at multiple co-locations, a managing entity may assign, to a particular user, a quota on the amount of requests for services that the user may submit. Under these circumstances, the user's accesses to multiple co-locations must be considered when determining whether the user has exceeded its quota.

Managing traffic across co-locations often requires operating a layer of servers that are external to the co-locations themselves, but that manage the tasks performed by the servers that belong to those co-locations. Such servers are referred to herein as "external servers." The external servers are often a part of a backbone infrastructure, and are configured to aggregate and manage web service information.

The external servers may be responsible for interpreting and enforcing network policies. For example, the external servers may be responsible for deciding whether requests received by web servers that belong to co-locations may be serviced. The external servers may also be responsible for aggregating traffic information for the co-locations, and managing a variety of other aspects of web services provided at the co-locations.

Managing web traffic may be implemented in external servers in a variety of ways. For example, the external servers may be configured to determine whether traffic management policies allow requests to be serviced. More specifically, the external servers may be configured to determine whether servicing a request from a particular request sender complies with the limits and quotas provisioned for the particular request sender.

Regardless of the implementation, reliance on external servers often establishes a separation between traffic management functionalities (delegated to the external servers), and traffic processing functionalities (delegated to web servers that belong to the co-locations). Unfortunately, the separation between the traffic management functionalities and the traffic processing functionalities may cause a variety of problems. For example, since the external servers and the web servers need to communicate with each other, a great deal of additional traffic is often generated between the servers. The additional traffic may negatively impact the network bandwidth. Furthermore, setting up, configuring and maintaining the external servers may be time-consuming and challenging. Integration of the external servers into a web service provider network may also be difficult.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
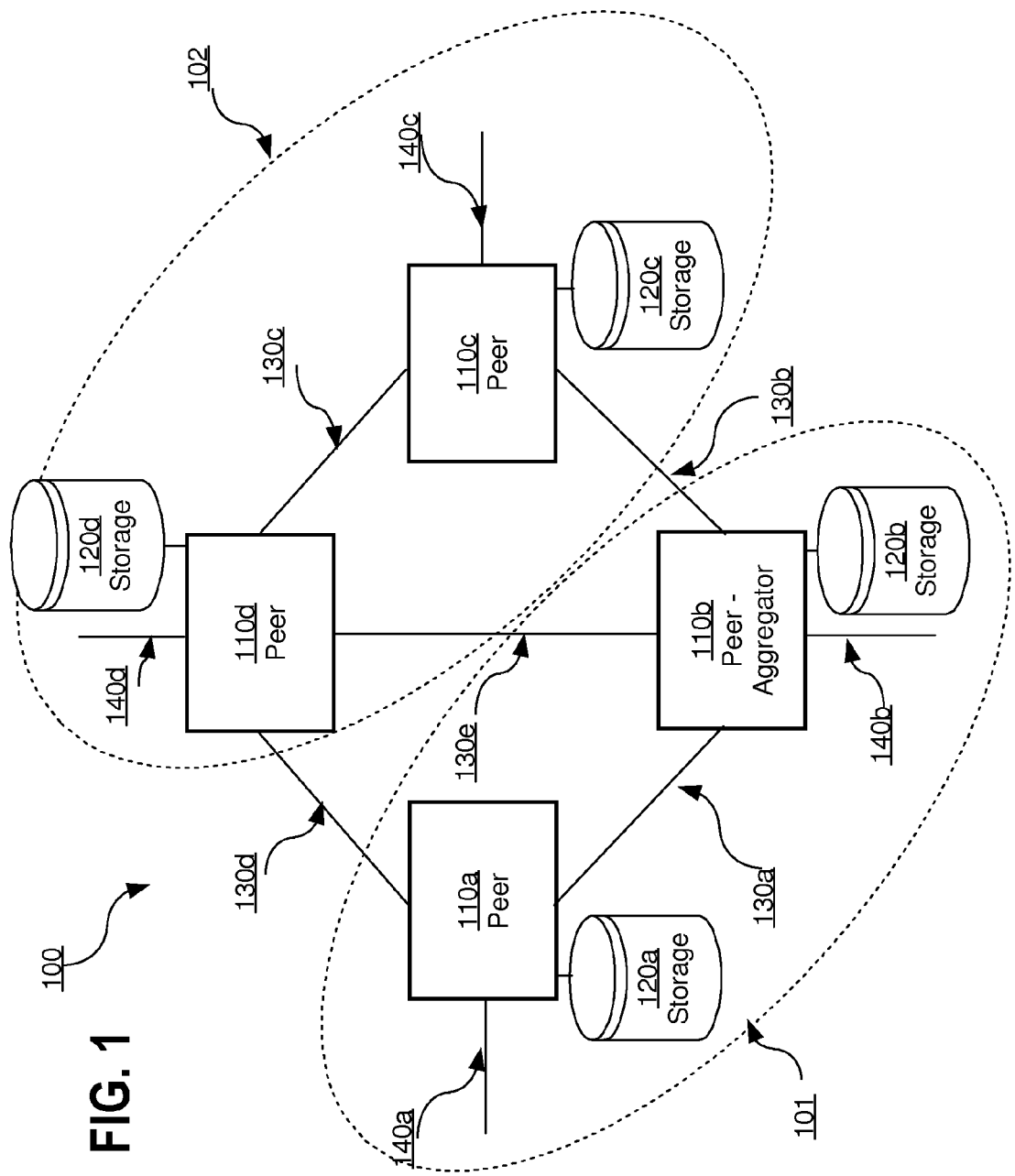
FIG. 1 depicts an embodiment of a peer-to-peer architecture system for web traffic management.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for configuring web servers to locally manage web service traffic received by the web servers. Contrary to the conventional approaches, the approaches described herein allow the web servers to receive and aggregate web traffic information from multiple co-locations without the use of external servers. Based on the aggregated web traffic information, the web servers themselves can locally decide whether received web service requests may be serviced, and service the requests if the locally derived decisions are positive. By enabling web servers to make policy decisions locally without involvement of external servers, both decision latency and external traffic overhead may be reduced.

The techniques described herein may be implemented in a variety of ways. For example, in one embodiment, the techniques may be implemented using software plugins to web servers. Depending on the implementation, the plugins may be executed as Apache™ modules, Tomcat™ Filters, Squid™ plugins, Traffic Server plugins, or any other software modules.

By delegating web traffic management functionalities to web servers, a need for operating a layer of external servers to manage web traffic in a co-location may be virtually eliminated. For example, according to the presented approach, upon receiving a request for providing a particular service, a web server application may locally decide whether the received request may be serviced. Such a decision may be derived without communicating with any other device of backbone infrastructure. Relying on locally stored information and web traffic policies, the web server application may be able to determine whether servicing the particular request would comply with the policies implemented in the co-location.

Peer-To-Peer Traffic Management

According to the approaches described herein, a web service network comprises a plurality of web servers. The web servers are referred to herein as peers. Various peers in the network establish peer-to-peer communications channels, and communicate with each other in the manner described below.

In an embodiment, a peer is configured to not only perform the functions of a conventional web server, such as receiving web service requests and servicing the requests, but is also configured to locally manage web traffic and collaborate with other peers in a web-traffic-decision making process. In contrast to a conventional approach, in which external servers manage the web-traffic, the peers described herein are configured to manage the web traffic locally and without interacting with the infrastructure.

A peer may be configured to act as a traffic interceptor and inspector, a traffic action actuator, a policy evaluator and an information exchanger. For example, a peer may be configured to intercept web traffic, inspect the intercepted traffic, retrieve locally stored information pertinent to the intercepted traffic, and use the retrieved information to determine the manner in which the traffic should be handled. The peer may also communicate with other peers to globally synchronize the information pertinent to the web traffic and policies.

Peer-To-Peer Management Example

Some of the functionalities of a traffic-management-enabled peer may be illustrated using the following example. Upon receiving, from a particular user, a request to download a particular video file, a peer may be able to determine whether servicing the particular request is permitted. In particular, the peer may be able to determine whether the particular user is provisioned in such a way that the user may request downloading video files. If so, then the peer may determine whether the particular user is allowed to download the requested video file. For example, the peer may determine whether there is a cap on the number of the requests the particular user may make for video files, and if so, whether the particular user has already reached the limit. Further, the peer may check whether the particular user is eligible to request the particular type of video files if, for example, the requested video file is classified as adult entertainment. The peer may also check other rules to determine whether servicing the particular request would violate other implemented policies.

If, after performing various tests and checks, a peer determines that servicing a particular request is permitted, then the peer may proceed to servicing the request. Otherwise, the peer may issue a notification indicating that servicing of the request has been denied.

Peer-Implemented Management

In addition to service handling functionalities, peers may also be responsible for managing web traffic globally. In particular, the peers may be responsible for synchronizing web traffic information with other peers. Synchronization of the web traffic information between peers may be required to ensure that web servicing policies are uniformly applied and executed by all peers. For example, since users may send multiple requests, and the requests may be received by different peers, the peers may need to communicate with each other to update their counts corresponding to the respective requests received from the respective users. By synchronizing the counts, the peers can ensure that the requests are serviced only if the updated counts remain below the quotas provisioned for the users. By synchronizing the counts and other web traffic information, the web traffic can be managed globally.

Count synchronization may be illustrated using the following example. Upon receiving a request from a particular user to download a particular video file, a peer may be configured to communicate the information about servicing the particular request to other peers. This may be particularly important if the request servicing is rate-limited. In particular, if the user is provisioned to request and download no more than one hundred (100) video files per month, and the video file requests from the user can be received by several peers, then the peers may need to exchange some information among themselves to manage the counts globally, and to service the received request only if the user has not yet reached the global monthly limit.

Peer-Aggregators

Peers that are responsible for managing web service traffic globally are referred to herein as peer-aggregators. While all peers are configured to manage the web service traffic locally, each of the peers may also be configured to manage global counters for a selected portion of the web service traffic. Those peers are referred to herein as peer-aggregators. Peer-aggregators may also be referred to herein as peers.

A peer-aggregator may globally manage a specific subset of web service traffic. The subset of web service traffic that is assigned to a managing peer-aggregator may be specified in a variety of ways. For example, a particular aggregator may be configured to manage the web traffic:

generated by a particular set of users,
comprising a particular type of request,
generated from a particular co-location, or
any traffic combination thereof.

A peer-aggregator may manage a specific set of global counters, receive counter updates from the peers that manage the corresponding local counters, update the global counters using the updates received from the peers, and disseminate the updated values of the global counters to the peers If two or more peer-aggregators are selected to manage global counters, then the managing responsibility may be divided between the peer-aggregators. An assignment between the global counters and the peer-aggregators may be defined in a mapping. The mapping may map request attribute sets to peer-aggregators. A request attribute set is one or more attributes of a request. One example of an attribute set is "requests from user X." In this example, the request attribute set is the identity of the requestor. A mapping that is based on the identity of the requestor may specify, for example, that peer-aggregator 1 manages global counters for requests from users A-K, peer-aggregator 2 manages global counters for requests from users L-R, and peer-aggregator 3 manages global counters for requests from users S-Z.

An identity of the requestor is merely one example of a request attribute that may be used to map requests to peer-aggregators. Request attribute sets may be based on any type and combination of request attribute. For example, a request attribute set may be "requests with classifier Y," or "requests from user X that have classifier Y."

Such mappings, as well as policies and other configuration data, may be downloaded to peers from a distributed configuration management system like Zookeeper™ and installed in local storage devices associated with a respective peer.

Each time a new peer is initiated, restarted or removed, the mapping may be updated and redistributed to peers. For example, if a peer-aggregator 4 is added to the system that includes peer-aggregators 1-3, then the mapping may be revised to assign the new peer-aggregator 4 the responsibility of managing requests from some specific set of users, which, prior to the addition of peer-aggregator 4, were assigned to peer-aggregators 1-3.

System Overview

FIG. 1 depicts an embodiment of a peer-to-peer architecture system 100 for web traffic management. In an embodiment, a system 100 is a web service network comprising a plurality of peers 110a . . . 110d.

Peers 110a . . . 110d may be dedicated to manage requests from separate sets of users and/or separate types of requests. For example, a set of peers 110a . . . 110d may be divided into groups, and each group of peers may be dedicated to receive and manage requests from a different set of users. According to another example, each group of peers may be dedicated to receive and manage requests of a different type.

In an embodiment, peers 110a . . . 110d are distributed among two co-locations: a first co-location 101, and a second co-location 102. In an embodiment, first co-location 101 comprises peer 110a and peer 110b, while second co-location 102 comprises peer 110c and peer 110d. Although FIG. 1 depicts four peers 110a . . . 110d, system 100 may comprise any number of peers. In the description below, references are made to peers 110a . . . 110d; however, in practical embodiments, the description is applicable to any number of peers in system 100.

In an embodiment, peers 1110a . . . 110d are web servers configured to store, update and maintain various types of mapping information, policies, and configuration data. Peers 110a . . . 110d may store the mappings, policies and other data in respective local data storage devices 120a . . . 120d. In the example depicted in FIG. 1, peer 110a has an associated storage device 120a, peer 110b has an associated storage device 120b, peer 110c has an associated storage device 120c, and peer 110d has an associated storage device 120d. Each of the respective storage devices 120a . . . 120d may implement a database system, a relational database system, or any other data storage structure configured for storing data.

Storage devices 120 . . . 120d may be used to store information about peers, users, types of web service requests, and other types of information. The information may be stored in a variety of data structures, such as tables, pointers, or others. For example, a data structure maintained in storage 120a may store data indicating that peer 110a is dedicated to service music download requests received at co-location 101, while a data structure maintained in storage 120c may store data indicating that peer 110c is dedicated to service video download request from all users from both co-locations, co-location 101 and co-location 102.

In an embodiment, peers 110a . . . 110d are also configured to receive web service requests. Examples of the requests may include requests for downloading audio files, downloading video files, downloading webpages, executing an Internet search, executing software applications, playing games, storing data in a cloud system, and any other web-service-related requests.

Web service requests may be sent to peers 110a . . . 110d from various entities, such as users, service subscribers, quest users, servers and/or networks communicatively coupled with system 100. For example, a user who registered his account with a service provider network of system 100, such as a Yahoo! network, may be eligible to send his requests to peers 110a . . . 110d, and the requests may comprise requests for downloading audio files or video files from the Yahoo! network.

In the example depicted in FIG. 1, each peer 110a . . . 110d locally manages the received web traffic. In some implementations, each peer 110a . . . 110d may receive web traffic from a user, or from a group of users; conversely, each user may send web service requests to one or more peers 110a . . . 110d. In some other implementations, each peer 110a . . . 110d receives web traffic from a particular group of users, and each group of users may send web service requests only to a particular peer of peers 110a . . . 110d. In yet other implementations, each peer 110a . . . 110d receives one or more types of web service requests from one or more groups of users.

In the example depicted in FIG. 1, peer 110a may be configured to receive web service requests along an input link 140a, peer 110b may be configured to receive web service requests along an input link 140b, peer 110c may be configured to receive web service requests along an input link 140c, and peer 110d may be configured to receive web service requests along an input link 140d. In practical embodiments, each peer may be communicatively coupled to a plurality of input links and may receive requests from various entities and any number of users.

In an embodiment, some or all peers within system 100 communicate with each other. In the example depicted in FIG. 1, peers 110a and 110b communicate with each other via a communications link 130a, peers 110a and 110b communicate with each other via a communications link 130a, peers 110b and 110c communicate with each other via a communications link 130b, peers 110c and 110d communicate with each other via a communications link 130c, peers 110d and 110a communicate with each other via a communications link 130d, and peers 110b and 110d communicate with each other via a communications link 130e. Depending on the practical implementation, additional communications links may be defined in system 100, or some of the communications links 130a . . . 130e may not present in system 100.

Peer-To-Peer Network

A peer-to-peer (P2P) network refers to a computer network in which peers may act as clients and servers for other peers in the network. In a P2P network, the peers are usually configured with similar or compatible software to facilitate data transmission connectivity and data exchange between the peers.

Peers 110a . . . 110d may communicate with each other to exchange a variety of information. For example, peers 110 . . . 110d may update each other with respect to the quantity and the type of web service requests serviced. The updates may be exchanged along communications links 130a . . . 130e.

In an embodiment, peers 110a . . . 110d and communications links 130a . . . 130d are configured as a peer-to-peer (P2P) communications network. The communications links may be established at the time the respective peers are initialized or restarted, or at the time a peer determines that establishing a P2P link with another peer is necessary.

Using communications links 130a . . . 130e, peers 110a . . . 110d may exchange locally managed information to enable a synchronization of globally managed data and to enable web service rate-limiting. Synchronization of the globally managed data may refer herein to synchronizing global counters.

Peers

In the illustrated embodiment, peers 110a . . . 110d are configured to manage web service requests locally. Specifically, peers 110*a* . . . 110*d* are configured to receive requests, determine whether the received requests may be serviced, and if so, to service the requests. For example, upon receiving a particular request at peer 110*a*, peer 110*a* may refer to information included in the received request and data stored in local storage device 120*a* to determine whether the request may be serviced. If the request may be serviced, then peer 110*a* may service the request and update the data in local storage device 120*a*. However, if peer 110*a* determines that the request cannot be serviced, then peer 110*a* may send a notification to the requestor to indicate that servicing the request was denied.

In managing web service requests, peers 110*a* . . . 110*d* rely on a variety of data stored in respective data storages 120*a* . . . 120*d*. The data may comprise various policies, user profiles, request limits, local counters and other data deemed to be helpful in managing web service traffic locally. For example, if peer 110*a* received a request from a particular user and the request pertains to downloading a particular music file, then peer 110*a* may parse the received request to determine the identity of the particular user, retrieve the local counters and quotas (limits) available for the particular user, and use the retrieved data to determine whether the request may be serviced.

Associations Between Requestor Identifiers, Counters and Quotas

In managing web service requests, peers 110*a* . . . 110*d* may rely on information identifying associations between users, counters and quotas. The associations may be stored in a variety of data structures, such as tables, pointers and other structures. For example, each of peers 110*a* . . . 110*d* may maintain a multi-dimensional table containing the associations between requestor identifiers, counters and quotas for each user. Upon receiving a particular request from a particular user, a peer may parse the request to identify a particular requestor identifier, use the multi-dimensional table to identify a local counter associated with the particular requestor identifier, and identify a corresponding quota associated with the particular local counter for the particular user. The multi-dimensional tables may be maintained as user profiles, and may be customized when a user is provisioned for the services, or may be set to default values implemented by the network.

A user profile may be customized for a particular user or may be set up as a default profile. The profile information may be distributed to a peer when the peer is restarted or initiated. For a particular user, the profile information may include data indicating the type of requests that the user may request, the quotas for each type of requests that the user may request, and any other type of information specific to the user. In other embodiments, information about the quotas and other user-specific information are stored in data structures other than user profiles.

Global Counters

A global counter associated with a particular entity and/or a particular type of request is a value that indicates the number of times that requests from the particular entity and/or the requests of a particular type have been cumulatively serviced by the peers of system 100 since a particular point in time, such as a beginning of a web service billing period. For example, if peer 110*a* has serviced ten (10) requests from user A since a new billing period started, and peer 110*b* serviced five (5) requests from user A since the new billing period started, then the global counter has the value of fifteen (15), and indicates that the peers of system 100 serviced fifteen (15) requests from user A since the new billing period started.

Global counters may be defined at different levels of granularity. For example, at a lowest level of granularity, global counters may be defined for each user; while at the higher level of granularity global counters may be defined for each type of requests for each user.

Referring to FIG. 1, a global counter defined for a particular user and for system 100 depicted in FIG. 1, may be a measure of all requests that have been cumulatively served for the particular user by peer 110*a*, peer 110*b*, peer 110*c* and peer 110*d* since a beginning of the billing cycle. Hence, if user A sent ten (10) requests to each of peers 110*a* . . . 110*d*, and all the requests were served by the respective peers, then a corresponding particular global counter should reflect the fact that forty (40) requests were serviced for the particular user.

A global counter defined for a particular type of request for a particular user may be a measure of the total number of the requests of the particular type and received from the particular user that have been cumulatively serviced by all peers in a network since the beginning of the billing cycle. For example, a global counter defined for music-file download requests from user A and for system 100 depicted in FIG. 1, may be a measure of all music-file download requests cumulatively received from user A and serviced by peer 110*a*, peer 110*b*, peer 110*c* and peer 110*d*. Hence, if user A sent ten (10) music-file download requests to each of peers 110*a* and 110*b*, and ten (10) video-file download requests to each of peers 110*c* and 110*d*, and all the respective requests were serviced by the peers, then a particular global counter for music-file downloads should reflect the fact that twenty (20) music-file download requests were serviced for the particular user.

A global counter may be maintained and managed by any one of the peers 110*a* . . . 110*d*. Such a peer may be referred to as a peer-aggregator, or an aggregator. Other peers may maintain and periodically update a copy of the global counter. A copy of the global counter maintained by a peer is referred herein to as a global counter snapshot. For example, a particular global counter associated with a particular user may be managed by peer-aggregator 110*b*, while other peers 110*a*, 110*c* and 110*d* may maintain particular global counter snapshots of the particular global counter.

Local Increment Counters

A local increment counter is a value that is maintained locally by a peer and indicates the number of times that the peer has serviced requests from a particular entity, and/or a particular type of requests, since a particular point in time, such as the time when the local increment counter was reset. For example, if peer 110*a* has serviced ten (10) requests from user A since peer 110*a* reset a corresponding local increment counter, then the local increment counter, maintained by peer 110*a* should indicate ten (10). Once peer 110*a* transmits the value associated with the local increment counter to a peer-aggregator for aggregation, peer 110*a* may reset the local increment counter to zero (0), and start counting the requests serviced for user A since the last reset of the local increment counter.

Although there are differences between global counters and local increment counters, there is a correspondence between the global counters and the local increments counters. Although global counters are managed globally by peer-aggregators and local increment counters are maintained locally by the peers, each particular global counter is associated with one or more local increment counters. For example, a particular global counter maintained by peer-aggregator 110b may have three corresponding particular local increment counters maintained by peer 110a, 110c and 110d, respectively. While a particular global counter represents a total count of requests of a particular type and/or from a particular user that have been cumulatively serviced by the peers since, for example, a beginning of a new billing cycle, corresponding local increment counters may represent the number of requests of the particular type and/or from the particular user that have been serviced by a respective peer since the time the corresponding local increment counter was reset.

Local increment counters may be defined at different levels of granularity. For example, at a lowest level of granularity, local increment counters may be defined for each user. At this lowest level, one local increment counter may be maintained for each user, and a particular local increment counter for a particular user may indicate the total number of requests that the peer has serviced for the particular user since the particular local increment counter was reset. At the higher level of granularity, local increment counters may be defined for each type of requests for each user. At this higher level, the peer may maintain many local increment counters for each user, and each increment counter for a particular user may measure the total number of the requests of the particular type received from the particular user and serviced by the peer since the particular local increment counter was reset.

Counter-Related Policies

Various policies may be implemented to determine whether a peer may service a received request. The policies may be implemented to capture various rate-limiting schemes implemented in system 100. An exemplary policy may state that the music-file-requests from a user are limited to a predetermined quota on a monthly-basis. Another policy may state that the requests for adult entertainment content may be serviced only to adult users. Other policy may state that the requests from unauthorized users (for example those whose web-service subscriptions have expired) may not be serviced.

In managing web traffic, peer-aggregators may take into account values associated with a variety of counters. For example, upon receiving a request, peer 110a may parse the request to determine a sender of the request, retrieve a global counter snapshot associated with the sender, and determine whether servicing the particular request could cause exceeding a predetermined quota. In particular, peer 110a may user a global counter snapshot and a local increment counter to determine whether servicing the received request could cause exceeding of the predetermined quota.

Associations Between Local Increment Counters and Global Counter Snapshots

In an embodiment, peers maintain data structures that capture associations between local increment counters, managed locally, and global counter snapshots that are copies of the global counters and that are managed globally. Examples of such data structures may include correspondence tables, in which local increments counters have associated global counter snapshots. In a correspondence table, each local increment counter may be represented by a local counter identifier, such as an alphanumeric string. Further, in the correspondence table, each global counter snapshot may be represented by a global counter identifier, such as an alphanumeric string, and may be associated with a global counter managed globally.

A peer may maintain a correspondence table indicating a correspondence between the local increment counters managed locally by the peer and the respective global counter snapshot. For example, if peer 110a locally manages a first local increment counter, which is associated with a first global counter snapshot, then the correspondence table maintained by peer 110a may contain a data row indicating the correspondence between the first local increment counter and the first global counter snapshot. The information included in the correspondence table maintained by a peer represents the association between the local increment counters and global counter snapshots.

Associations Between Local Increment Counters and Global Counters

An aggregator may maintain a correspondence table indicating a correspondence between the global counters managed by the aggregator and local counter increments that are associated with the global counters, but that are managed by peers. The tables maintained by the aggregators may be created based on information included in the tables maintained by the peers. For example, if aggregator 110b manages a first global counter that is associated with a first local increment counter, which is locally managed by peer 110a, then the correspondence table maintained by aggregator 110b may contain a data row indicating the correspondence between the first global counter and the first local increment counter. The information included in the correspondence table maintained by an aggregator may be useful in determining which global counter should be updated when the aggregator receives a particular local increment counter data from a peer.

Communications Between Peers and Aggregators

Peers 110a . . . 110d may be configured to periodically communicate with aggregators to facilitate global management of web service traffic. The peers may transmit values of local increment counters to allow the aggregators to update the respective global counters. For example, each peer 110a . . . 110d may maintain a respective local increment counter indicating the total number of requests that the peer has received and serviced for a particular user since the respective local increment counter was reset, and each peer 110a . . . 110d may transmit the respective local increment counter data to an aggregator that maintains a corresponding global counter.

Upon receiving the respective local increment counter data, an aggregator may use the received information to increase the value associated with a corresponding global counter. The increased value becomes a current value associated with the corresponding global counter, and represents the total number of requests that have been serviced by all peers for the particular user since, for example, a new billing web service billing period started. The current value may be transmitted from the aggregator to peers 110a . . . 110d.

In response to receiving the current value of the global counter, peers 110a . . . 110d use that value to update their respective global counter snapshots. Once updated, the respective global counter snapshots indicate the total number of requests serviced by all peers for the particular user, since, for example, a beginning of a billing cycle.

Request-Handling Example

Figure 2:
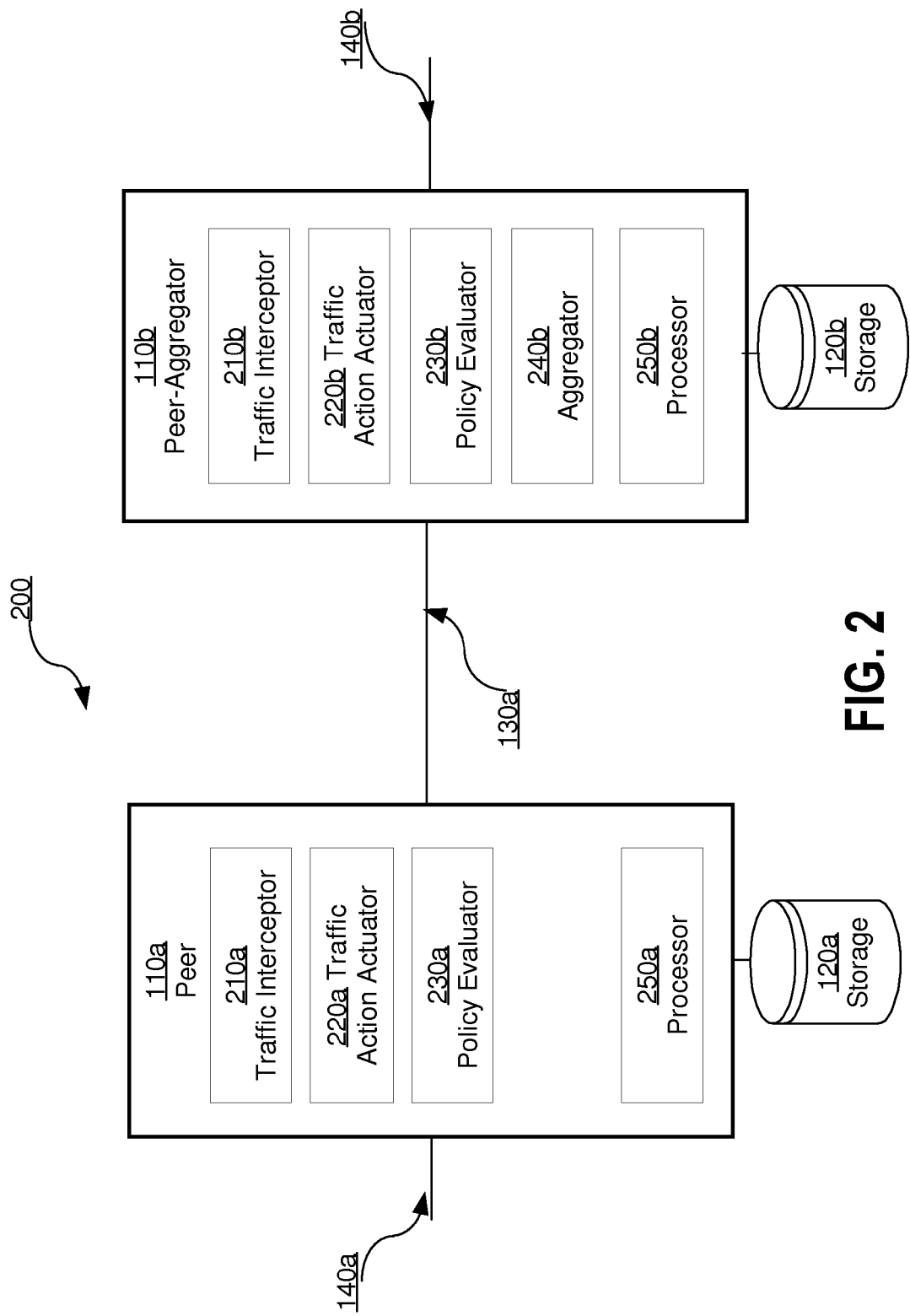
FIG. 2 depicts an embodiment of a peer-to-peer architecture system for web traffic management.

Some of the tasks performed by peer 110a and peer-aggregator 110b may be illustrated using the example depicted in FIG. 2. FIG. 2 depicts an embodiment of a peer-to-peer architecture system 200 for web traffic management. In an embodiment, a peer-to-peer architecture system 200 comprises a peer 110a communicatively coupled with a peer-aggregator 110b via a communications link 130a. Although the example depicted in FIG. 2 illustrates that peer 110a communicates with one peer-aggregator 110b, in practical embodiments, peer 110a may communicate with a plurality of peer-aggregators, and peer-aggregator 110b may communicate with a plurality of peers.

In an embodiment, peer 110a maintains one or more local storage devices 120a, and peer-aggregator 110b maintains one or more local storage device 120b. Additional storage devices, such as shared database system, may also be available to peers 110a and 110b.

Peer 110a may comprise a plurality of hardware-software implemented modules, examples of which comprise one or more traffic interceptors 210a, one or more traffic action actuators 220a, one or more policy evaluators 230c, and one or more processors 250a. Although FIG. 2 depicts one interceptor 210a, one traffic action actuator 220a, one policy evaluator 230a, and one processor 250a, multiplicity of the respective modules may also be implemented. Further, peer 110a may comprise other modules, which are not depicted in FIG. 2.

Peer-aggregator 110b may comprise a plurality of hardware-software implemented modules, examples of which comprise one or more traffic interceptors 210b, one or more traffic action actuators 220b, one or more policy evaluators 230b, one or more aggregators 240b, and one or more processors 250a. Although FIG. 2 depicts one interceptor 210b, one traffic action actuator 220b, one policy evaluator 230b, one aggregator 240b, and one processor 250b, multiplicity of the respective modules may also be implemented. Peer-aggregator 110b may also comprise other modules, not depicted in FIG. 2.

A traffic interceptor 210a/b may be configured to receive traffic, including web service requests. Examples of the requests are provided above.

Traffic interceptor 210a/b may also be configured to inspect received web service requests, determine whether the requests contain all required components and syntactically comply with policies implemented in system 200.

In the example depicted in FIG. 2, peer 110a is configured to receive and locally manage web service requests, and peer 110b is configured to act as an aggregator and globally manage global counters. In other implementations, each peer may be able to receive and manage web service requests and also act as an aggregator. In yet other implementations, some aggregators may be configured to act only as aggregators, while other peers may be configured to act as aggregators and peers.

In an embodiment, when a peer receives a web request, the traffic interceptor 210a/b within the peer parses the request, extracts a requestor identifier that indicates a request sender, and optionally, extracts one or more classifiers indicating one or more types of the requests.

A requestor identifier may uniquely identify the sender of the request. A sender may be a user, a group of users, or any other entity configured to send web service requests. Examples of identifiers may include hash values generated from a user identification data. For instance, a requestor identifier may be a hash value that was obtained by hashing a user name, user domain name, or user IP address using any known hashing function.

A classifier may uniquely identify the type of the received request. Presence of one or more classifiers in a received request is optional. For example, a classifier may indicate whether the received request pertains to downloading a music file, downloading a video file, downloading a webpage, or storing a file in a cloud. Hence, a request for downloading a music file may comprise a requestor identifier that specifies the requestor who sent the request, and a request classifier that specifies that the request pertains to downloading a music file.

If a classifier is specified, then separate corresponding local and global counters and quotas may be defined for each particular type of the request for the particular requestor. For example, if a request comprises a requestor identifier and one or more classifiers, then a peer may maintain a separate local counter for each of the types of the requests, indicated by the classifiers, and refer to separate quotas associated with the respective local counters.

A traffic action actuator 220a/b within the peer determines whether received web service requests may be serviced by peer 110a/b. Traffic action actuator 220a/b may make the determination based on the content of the received request and the information stored in local storage 120a/b (e.g. the applicable policies and counter values). Details related to these functionalities are provided in reference to FIG. 4.

To determine whether a received web service request may be serviced, a policy evaluator 230a/b within the peer determines one or more policies to be enforced in processing web service requests received by peer 110a/b. For example, policy evaluator 230a/b may be configured to determine respective local counters, predetermined limits (quotas) for the local counters, and other information helpful in determining whether the received request may be serviced. Furthermore, policy evaluator 230a/b may be configured to determine one or more peer-aggregators that are responsible for synchronizing the counters and enforcing web service rate-limiting, as described below.

One or more processors within each peer (e.g. processor 250a/b) may be configured to execute commands and instructions specific to peer 110a/b. For example, processor 250a/b may facilitate communications to and from peer 110a/b, process commands received by and executed by peer 110a/b, process responses received by peer 110a/b, and facilitate various types of operations executed by peer 110a/b. Processor 250a/b may comprise hardware and software logic configured to execute various processes on peer 110a/b. Processor 250a/b may implement the processes described herein using hardware logic such as in an application-specific integrated circuit (ASIC), field-programmable gate array (FPGA), system-on-a-chip (SoC) or other combinations of hardware, firmware and/or software.

Mappings

A mapping is a function that defines relations between data. In the context of assigning responsibilities to aggregators, a mapping may define relations between request attributes, such as the identity of the requestor, and aggregators that manage the respective global counters. For example, a mapping may define a relation between a particular group of request senders and a particular aggregator that is responsible for globally managing the web traffic generated by the particular group.

In a mapping, request senders may be identified by requestor identifiers. A requestor identifier may be generated as a hash value of the sender-specific information. For example, for each request sender, a unique requestor identifier may be obtained as a hash value that is generated by applying a hash function to the sender identification information. Examples of the sender identification information may include the user account identification, the user IP address, or any other user identification data.

In other embodiments, a mapping may define relations between request sender, request classifiers, and aggregators. For example, a mapping may define a relation between request-specific information and a particular aggregator that is responsible for managing global counters for the particular sender. The request-specific information may include a particular request classifier associated with the request, a particular user identifier, and other request-specific data.

A mapping may map requests to aggregators based on any number and type of request attribute. For example, in a system that maintains global counters defined on a per-requestor basis, the mapping may establish one-to-one relations between requestor identifiers and aggregators. On the other hand, in a system that maintains global counters defined on a per-requestor/per-classifier basis, the mapping may establish one-to-one relations between a) each requestor identifier/classifier combination and b) aggregators. Also, a mapping may define many-to-one relations between requestor identifiers and aggregators, or many-to-one relations between request classifiers for each requestor identifier and aggregators.

Figure 3:
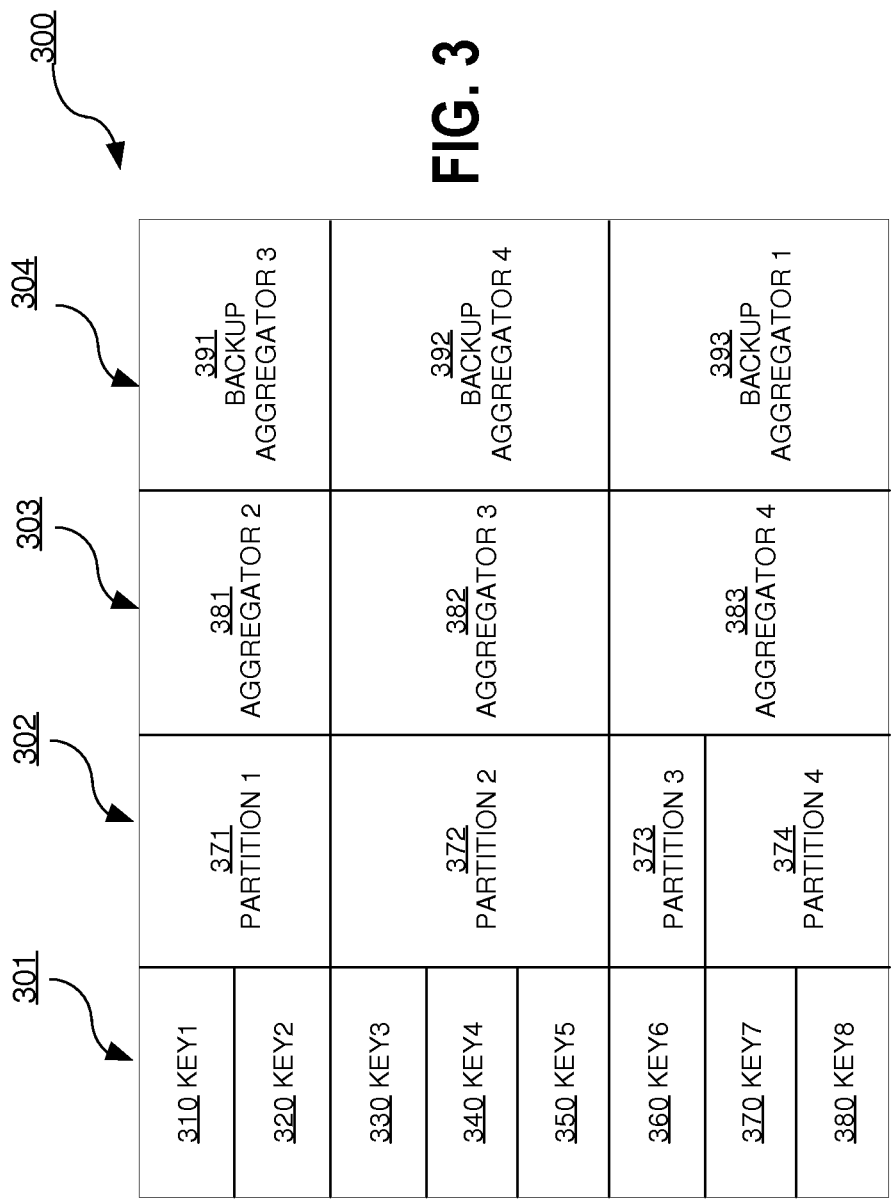
FIG. 3 depicts an embodiment of a mapping for peer-to-peer architecture for web traffic management.

FIG. 3 depicts an embodiment of a mapping 300 for peer-to-peer architecture for web traffic management. The example depicted in FIG. 3 is merely one of many possible implementations of the relations between requestor identifiers and peer-aggregators. Other mappings and approaches may also be implemented.

Mapping 300 depicted in FIG. 3 is represented in a form of a table comprising columns and rows; however, other representation of mappings, such as pointer-based mappings, may also be implemented. The table depicted in FIG. 3, comprises rows and columns and captures relations between the data stored in the respective rows and columns.

Organizations of table 300 may vary. For example, the table 300 may have multi-level tables and sub-tables, pointers or other elements.

If a mapping is represented using a table, the number of rows in the table may depend on the number of unique requestor identifiers, and the number of columns in the table may depend on how the requestor identifiers are grouped, whether partition identifiers are defined, whether backup aggregators are available, and a variety of other factors.

In the example depicted in FIG. 3, table 300 comprises four columns 301, 302, 303 and 304. Column 301 may be used to store requestor identifiers created for the users (requestors) who are eligible to send web service requests to the network. The requestor identifiers may be alphanumerical strings uniquely identifying the users. The requestor identifiers may correspond to hash values generated using a hash function applied to user identification information, such as a user name, domain name, IP address, or other information. In the depicted column 301, requestor identifiers KEY1 310 . . . KEY8 380 are stored in separate rows, one key in each row.

In an implementation not depicted in FIG. 3, column 301 may be used to store information about various classifiers identified for requestor identifiers. For example, column 301 may be used to store classifiers associated with video-file download requests, audio-file download request, file storing, or any other classifier. In yet other implementations, column 301 may be a hybrid column comprising combinations of requestor identifiers and classifiers.

Column 302 is optional; however, when present, it may be used to store partition identifiers. A partition identifier may be an alphanumeric string generated for a group of requestor identifiers. For example, in the example depicted in FIG. 3, KEY1 310 and KEY2 320 are associated with PARTITION 1 371, KEY3 330, KEY4 340 and KEY 5 350 are associated with PARTITION 2 372, KEY6 360 is associated with PARTITION 3 373, and KEY7 370 and KEY8 380 are associated with PARTITION 4 374. Column 302 is optional because in some implementations maintaining and managing partition identifiers may not be necessary.

Column 303 may be used to store identifiers of the aggregators (or peer-aggregators) that are dedicated to synchronize global counter information for the respective groups of requestors. In the example depicted in FIG. 3, according to the information included in table 300, AGGREGATOR 2 381 is dedicated to manage global counters for PARTITION 1 371 (including KEY1 310 and KEY2 320), AGGREGATOR 3 382 is dedicated to manage global counters for PARTITION 2 372 (including KEY3 330, KEY4 340 and KEY5 350), AGGREGATOR 4 384 is dedicated to manage global counters for PARTITION 3 (including KEY6 360) and PARTITION 4 374 (including KEY7 370 and KEY8 380).

Column 304 is optional, but when present, it may be used to indicate backup aggregators associated with the primary aggregators and configured to provide failover redundancy. Since not all configurations may provide an aggregator redundancy, either column 304 may be optional, or column 304 may be present, but some rows in column 304 may not be filled with information. In some implementations, multiple levels of the aggregator redundancy may be provided.

In the example depicted in FIG. 3, BACKUP AGGREGATOR 3 391 may be relied upon if AGGREGATOR 2 381 fails, BACKUP AGGREGATOR 4 392 may be relied upon if AGGREGATOR 3 382 fails, and BACKUP AGGREGATOR 1 393 may be relied upon if AGGREGATOR 4 383 fails. The BACKUP AGGREGATORS 391 . . . 393 may be maintained in a standby mode until they are needed. For example, if an aggregator identified as AGGREGATOR 2 391 fails, then an aggregator identified as BACKUP AGGREGATOR 3 391 may become active and assume the global counter management functionalities for the users whose requestor identifiers include KEY 1 310 and KEY 2 320.

Servicing Requests in a Peer-To-Peer Web Managed Network

Figure 4:
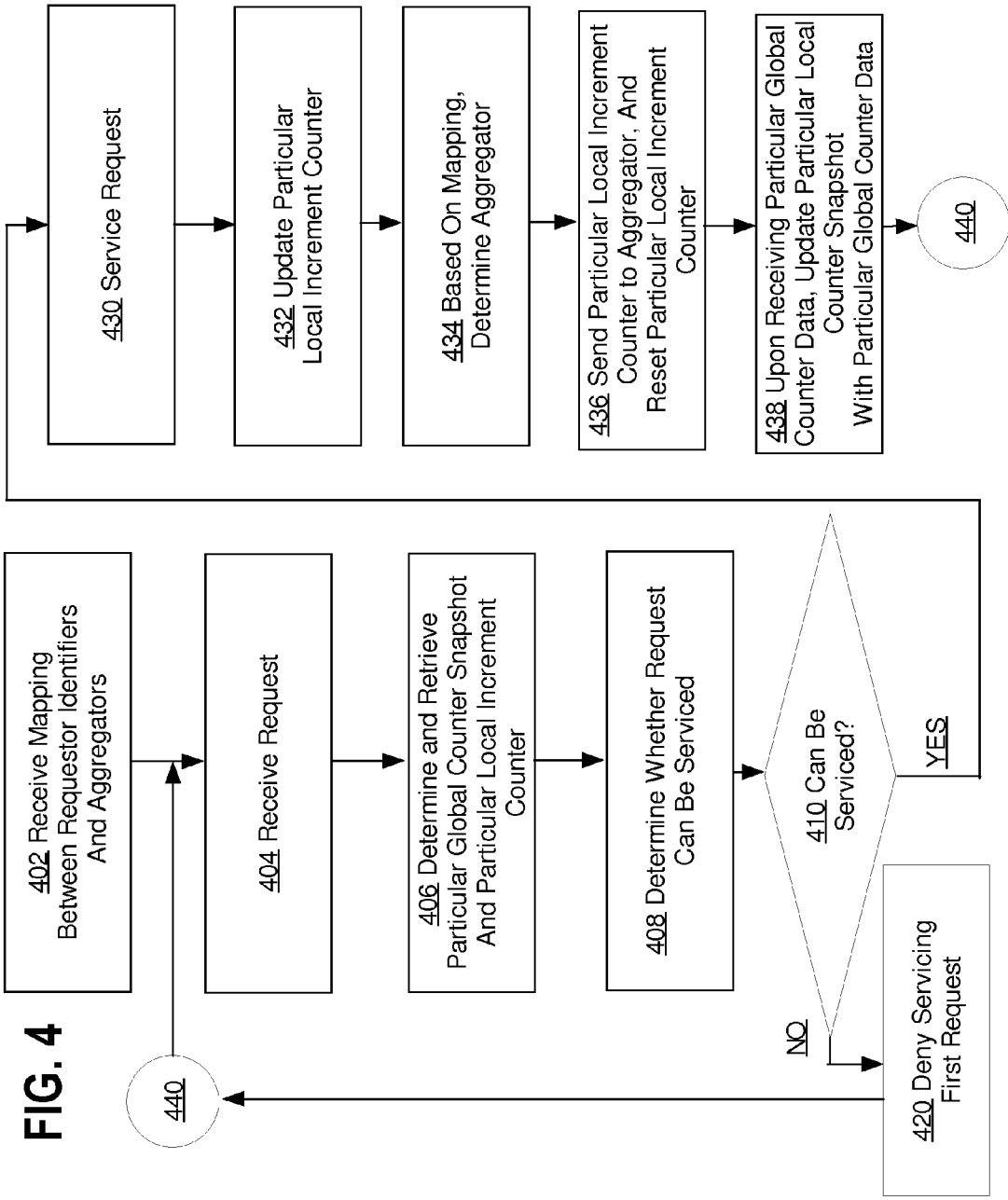
FIG. 4 depicts an embodiment of peer-to-peer processes for web traffic management executed by a peer.

FIG. 4 depicts an embodiment of peer-to-peer processes for web traffic management executed by a peer. The peer-to-peer processes depicted in FIG. 4 may be executed by any of the peers 110a . . . 110d of FIG. 1.

In step 402, a peer receives a mapping representing a correspondence between requestor identifiers and aggregators, and stores the mapping in local storage. The mapping indicates which aggregator manages global counters for which requestors and/or request types. The mapping may be represented as a table, example of which is depicted in FIG. 3. The mapping may be downloaded to a peer storage device from other storages, (Zookeeper™), or other configuration management systems. Examples of various mappings are described in FIG. 3.

In step 404, a peer receives a web service request. The received web service request may contain information indicating a requestor identifier of the user who sent the request, one or more classifiers indicating one or more types of the received request, and any additional data specific to the implementation.

Upon receiving a request, the peer parses the request and determines a requestor identifier of the user who sent the request. Further, the peer determines whether any classifier is included in the request, and if so, extracts the classifier (or classifiers).

In step 406, the peer retrieves information to be used in determining whether a received request may be serviced. The retrieved information would typically include one or more counters, and corresponding policy information. For example, the peer may retrieve a particular global counter snapshot and a particular local increment counter (described above), and a policy that indicates whether requests from the user are rate-limited. The particular counters may be associated with the requestor identifier. Alternatively, the particular counters may be associated with requestor identifiers and request-type-classifiers, as described above. The peer may use the particular counters in conjunction with the policy information to determine whether the received request may be serviced by the peer. Significantly, this determination is made locally without having to communicate with external servers.

According to another example, a peer may determine and retrieve a particular policy that may be used to determine whether a received request may be serviced. For instance, based on a requestor identifier included in the received request, the peer may retrieve a particular policy that states that the received request cannot be serviced if the request pertains to downloading adult entertainment content. Rate restrictions and content-type restrictions are merely two types of policies that may be enforced by the peer. The techniques described herein are not limited to any particular type of policy.

In step 408, using a retrieved particular global counter snapshot, a local increment counter policy, and optionally other information, a peer determines whether a received request may be serviced. For example, if there is a policy limiting video-file download requests to ten (10) requests per user per month, and the sum of the particular global counter snapshot and the local increment counter indicates that the requestor has already reached the request limit, then in step 410, the peer may determine that the request cannot be serviced, and in step 420, the peer may deny servicing the request.

However, if, in step 410, based on the retrieved counters and/or polices, a peer determines that a received request may be serviced, then, in step 430, the peer services the request. For example, the peer may service a request that required downloading a requested file, storing data in a cloud, downloading a requested web page, or executing other tasks specified in the received request.

In step 432, a peer updates data associated with a particular local increment counter to reflect the fact that a received request was serviced. For example, if the received request was for downloading a video file, and the request was serviced, then the peer may increase the particular local increment counter by one (1) to indicate the current status of the counter.

In step 434, a peer determines whether the particular local increment counter exceeds a predefined threshold value, and if so, the peer determines an aggregator to which the information about an updated local increment counter should be sent. To determine the aggregator, the peer may use data stored in the peer local storage, including the mappings described in step 402. The process of using the mappings and determining a particular aggregator is described in FIG. 3

In step 436, a peer sends local increment counter data to the aggregator identified in step 434. For example, as depicted in FIG. 2, peer 110*a* may send the local increment counter data to aggregator 110*b*, as described in detail in FIG. 2. Upon sending the local increment counter data to aggregator 110*b*, peer 110*a* resets the local increment counter to zero (0), to indicate that peer 110*a* sent the most up-to-date incremental count of the requests that peer 110*a* services for a particular user. (As described in detail in step 438, in response to sending the local increment counter data to aggregator 110*b*, peer 110*a* will receive updated global counter data, which peer 110*a* will use to overwrite its particular global counter snapshot.)

The local increment counter data is sent to aggregator 110*b* to allow the aggregator to advance a global counter by the local increment counter value, and disseminate the updated global counter to the peers. This process is referred to as a synchronization of the global counter in a P2P network. Synchronization of the global counter may be managed by an aggregator by advancing the global counter by the local increment counter value provided by a peer. For example, if peer 110*a* sent to aggregator 110*b* value of ten (10) as the local increment counter data, and the current value of the corresponding global counter, maintained by aggregator 110*b*, was one hundred (100), then aggregator 110*b* may add ten to one hundred, obtain one hundred ten (110) as the updated global counter value, and disseminate the updated global counter value to the peers. The updated global counter value will reflect the total number of requests that have been serviced for the particular user by all peers since, for example, a beginning of a web service billing cycle.

If, subsequently, another peer sends its local increment counter value of twenty (20) to aggregator 110*b*, and the current value of the corresponding global counter maintained by aggregator 110*b* is one hundred ten (110), then aggregator 110*b* may add twenty to one hundred ten, obtain one hundred thirty (130) as the updated global counter value, and disseminate the updated global counter value to the peers. The updated global counter value will reflect the total number of requests serviced for the particular user by all peers since, for example, a beginning of a new billing cycle.

In step 438, peer 110*a* receives, from aggregator 110*b*, global counter data associated with a particular user. The peer parses the received global counter data to determine a particular global counter snapshot, which corresponds to the global counter, but which is maintained locally by the peer. Peer 110*a* uses the global counter data to overwrite the corresponding global counter snapshot to reflect the total number of requests that have been serviced for the particular user by all peers since, for example, a beginning of a web service billing cycle.

Since the particular local increment counter was reset to zero (0) at step 436, and the particular global counter snapshot was updated to the current value at step 438, both maintained by peer 110*a*, the sum of the particular global counter snapshot and the particular local increment counter reflects the total number of requests serviced for the particular user by all peers since, for example, a beginning of a new billing cycle. Once peer 110*a* receives a new request from the particular user, peer 110*a* will proceed to step 404 (described above) and increment the local increment counter by one (1) if the particular request is serviced.

Managing Counters in a Peer-To-Peer Web Managed Network

Figure 5:
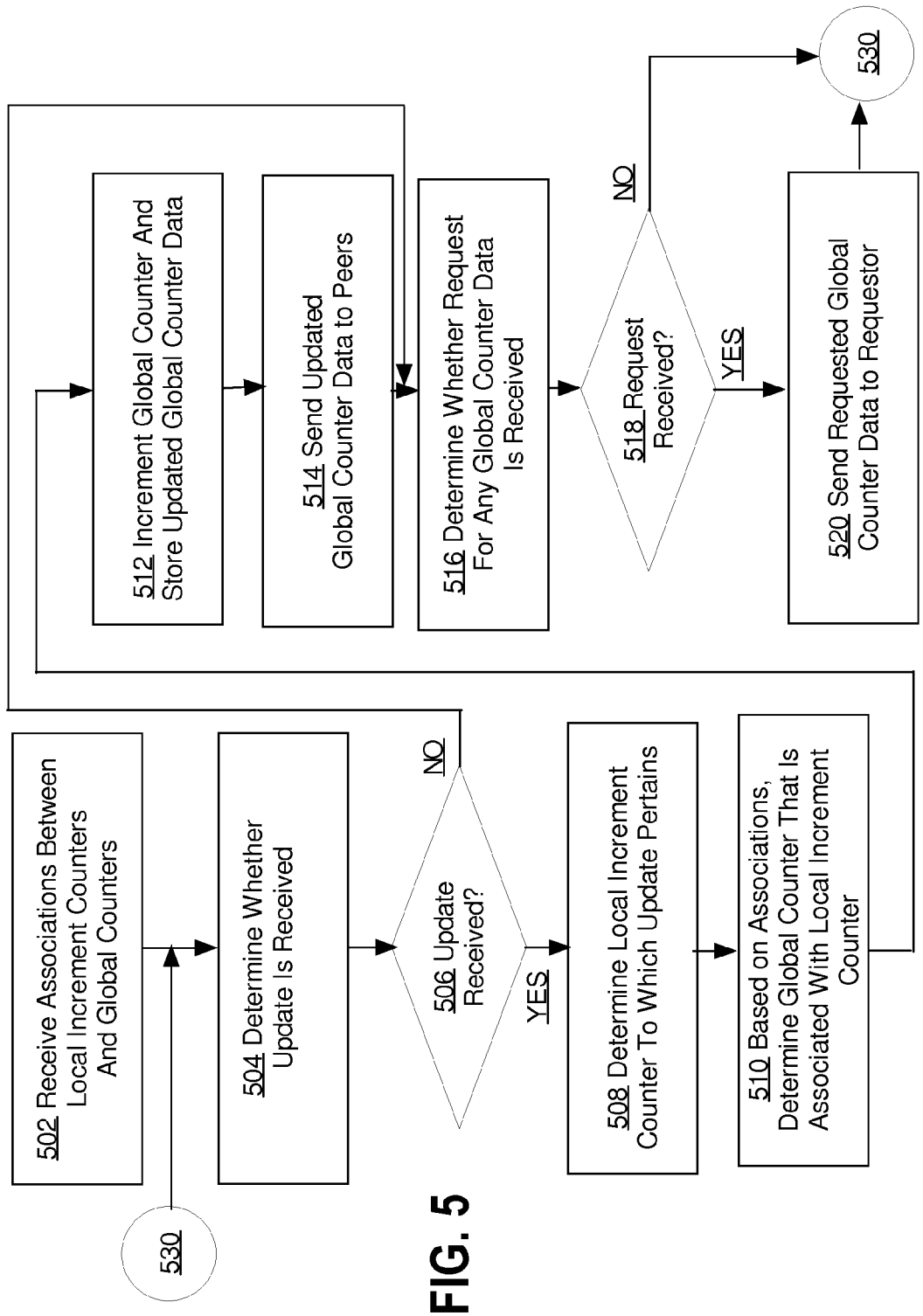
FIG. 5 depicts an embodiment of peer-to-peer processes for web traffic management executed by a peer-aggregator.

FIG. 5 depicts an embodiment of peer-to-peer processes for web traffic management executed by an aggregator. The peer-to-peer processes depicted in FIG. 5 may be executed by any aggregator, including a peer-aggregator 110*b* of FIG. 1.

In step 502, an aggregator receives and stores associations between local increment counters and global counters. As described above, local increment counters are managed locally by peers, while global counters are managed by aggregators. Each aggregator may manage a unique set of global counters and may obtain updates for some global counters from peers. The associations allow an aggregator to correlate the local increment counters (managed by the peers) with the global counters (managed by the aggregator). For example, upon receiving update data for a particular local increment counter, an aggregator may use the associations to determine a particular global counter that is associated with the particular local increment counter, and use the update data to update the particular global counter.

In step 504, an aggregator determines whether any local increment counter update is received from any peer. As described above, a peer may send local increment counter data when the peer determined that the local increment counter exceeded a predetermined threshold value. For example, if the predetermined threshold value for a particular increment counter is fifteen (15), then each time the particular increment counter exceeds the value of fifteen (15), the peer will send the local increment counter update to an aggregator, and reset the local increment counter to zero (0), as described in detail in step 436 in FIG. 4.

If in step 506 an aggregator determines that an update was not received, then the aggregator proceeds to step 516, described below. However, if in step 506, the aggregator determines that the update was received, then in step 508, the aggregator determines the request attribute (or combination of request attributes) to which the update information pertains.

In step 510, an aggregator uses information from the associations to determine a global counter that is associated with the local increment counter for which the update was received.

In step 512, an aggregator updates a particular global counter according to the information included in the received update. If the update includes a local increment counter data, then the aggregator uses the local increment counter data to advance the global counter by the local increment counter value. For example, if the local increment counter value indicated that a particular peer has serviced ten (10) request for a particular user since the local increment counter was lastly reset, and a respective global counter, maintained by the aggregator, has a value of one hundred (100), then the aggregator will add ten (10) to one hundred (100), and obtain one hundred ten (110), as the updated global counter value for the particular user. The updated global counter value of one hundred ten (110) will reflect the total number of requests that have been serviced for the particular user by all peers since, for example, a beginning of a web service billing cycle.

In step 514, an aggregator sends updated global counter data to peers. By sending the update global counter data to the peers, the aggregator allows the peers to synchronize their respective global counter snapshots to the updated global counter. By synchronizing the respective global counter snapshots for a particular user with the corresponding global counter for a particular user, a peer may obtain the count of the total number of requests that have been serviced by all peers since, for example, a beginning a new billing cycle. Further, by adding a respective local increment counter for the particular user to the value of the global counter snapshot for the particular user, a peer may obtain the count of the total number of request that have been serviced by all peers since the beginning of the new billing cycle plus the number of requests that the peer has serviced for the particular user since then.

In step 516, an aggregator determines whether any request for any particular global counter is received. Such a request may be received for example, when a peer is installed or restarted in a network. Also, such a request may be received when a standby aggregator becomes active and requires up-to-date global counter information.

If in step 518 an aggregator determines that a request for data for a particular global counter was received, then the aggregator retrieves the requested data, and proceeds to step 520, in which the aggregator sends the data to the requestor. Then, the aggregator proceeds to step 530, and then to step 504, described above.

However, if in step 518, an aggregator determines that no request for global counter data is received at the moment, then the aggregator proceeds to step 530, and then to step 504, described above.

Techniques described herein allow configuring web servers to locally manage web service traffic received by the web servers. The web servers may be configured to receive and aggregate web traffic information, locally decide whether the received web service requests may be serviced, and service the requests if the locally derived decisions are positive. Because the web traffic management functionalities are delegated to the web servers, there is no need to operate and maintain external servers for managing the web traffic. Each web server may locally decide whether the received request can be serviced.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
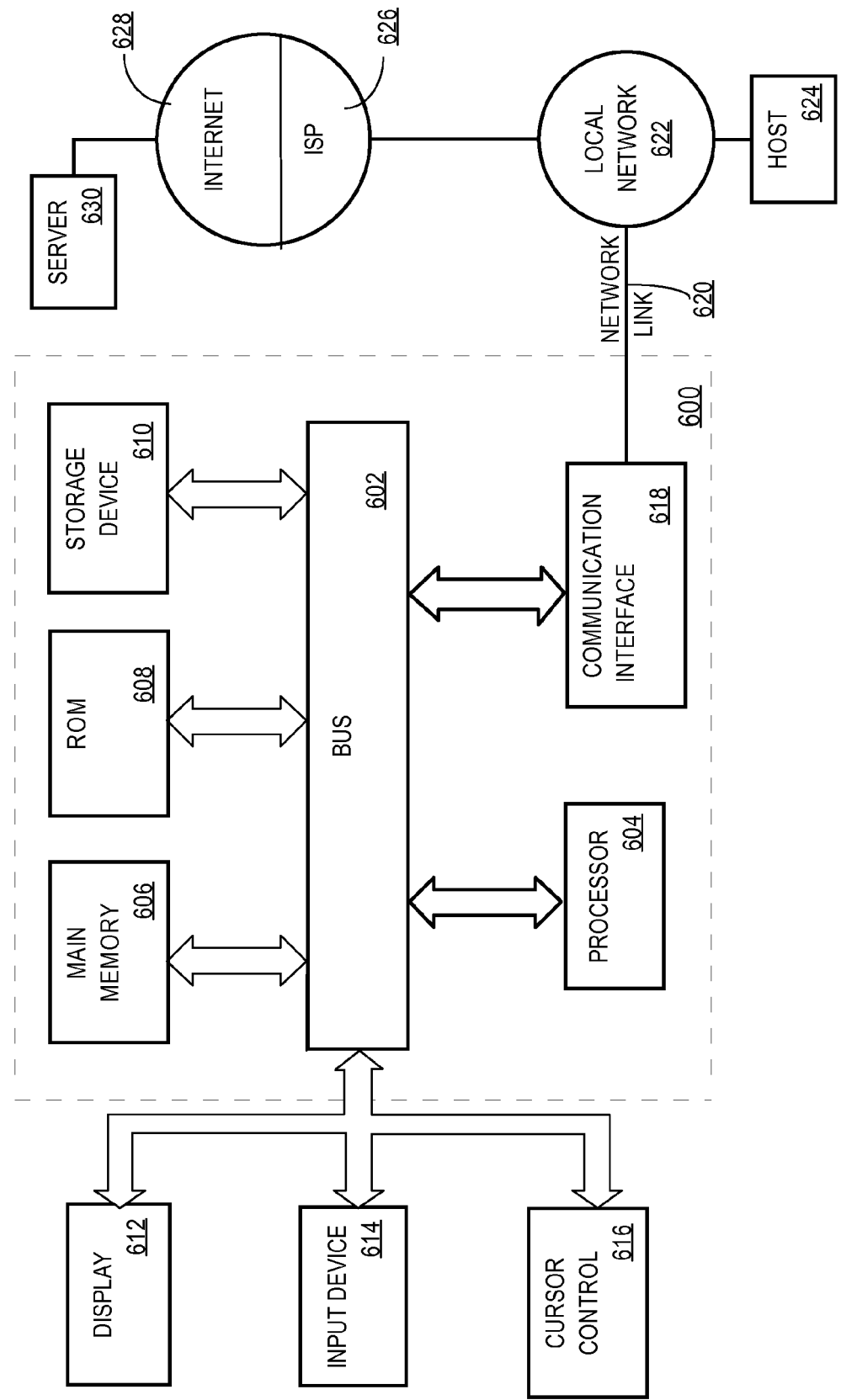
FIG. 6 is a block diagram that illustrates a computer system upon which an embodiment may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method comprising:
   establishing a first mapping between request attribute sets and a first set of peers in a network;
   wherein the peer to which each request attribute set is assigned is responsible for aggregating counter information associated with requests associated with the each request attribute set;
   receiving, at a first peer in the first set of peers, a first request associated with a first request attribute set;
   wherein the first mapping maps the first request attribute set to a second peer, in the first set of peers;
   based, at least in part, on determining that the first request is associated with the first attribute set, the first peer retrieving a first global counter snapshot and a first local increment counter from local storage associated with the first peer;
   based, at least in part, on the first global counter snapshot, the first local increment counter and policy information, the first peer determining whether the first peer can service the first request;

in response to determining that the first peer can service the first request:
    the first peer servicing the first request; and
    the first peer incrementing the first local increment counter to reflect that the first peer serviced the first request;
wherein the method is performed by one or more computing devices.

2. The method of claim 1 further comprising:
determining whether the first local increment counter exceeded a threshold value;
in response to determining that the first local increment counter exceeded the threshold value, transmitting the first local increment counter to the second peer, and resetting the first local increment counter to zero;
in response to the first peer receiving, from the second peer, a first global counter associated with the first global counter snapshot, the first peer updating the first global counter snapshot with the first global counter, and storing the updated first global counter snapshot in the local storage.

3. The method of claim 1, wherein:
the first mapping maps a second identifier to the first peer; and
the first peer is further configured to perform:
    receiving update data for one or more local counters snapshots from other peers in the set of peers; and
    based on the update data received from the other peers, updating the one or more local counters snapshots.

4. The method of claim 1,
wherein the first request comprises the first identifier, which identifies a first requestor that sent the first request; and
wherein the first mapping comprises one or more partitions, and each partition, from the one or more partitions, corresponds to a peer from the set of peers.

5. The method of claim 1, further comprising:
in response to detecting that a third peer is installed in the network:
    modifying the first mapping to represent a new mapping between the identifiers and a new set of peers;
    wherein the new set of peers comprises the set of peers and the third peer; and
    using the new mapping to determine a particular peer to which transmit updates for the first global counter.

6. The method of claim 4, further comprising:
determining whether the first requestor required provisioning for services offered by the network;
wherein the provisioning of the first requestor comprises determining, for the first requestor, one or more quotas associated with the one or more classifiers; and
wherein the determining whether the first peer can service the first request further comprises determining whether servicing the first request by the first peer could cause exceeding any of the one or more quotas associated with the one or more classifiers for the first requestor.

7. The method of claim 1, further comprising:
establishing a second mapping between the identifiers and a second set of peers in the network;
wherein the second set of peers comprises the peers of the first set of peers except the second peer;
detecting that the second peer is non-responsive;
receiving, at the first peer, a second request associated with the first identifier and the one or more classifiers;
based, at least in part, on the first identifier, the one or more classifiers, and the policy information, the first peer retrieving the first global counter snapshot and the first local increment counter;
based, at least in part, on the first global counter snapshot and the first local increment counter, the first peer determining whether the first peer can service the second request;
in response to determining that the first peer can service the second request:
    the first peer servicing the second request;
    the first peer updating the first local increment counter to reflect that the first peer serviced the first request;
    based on the second mapping, the first peer determining that the first local increment counter is to be sent to a fourth peer;
    the first peer transmitting the first local increment counter to the fourth peer and resetting the first local increment counter to zero; and
in response to the first peer receiving, from the fourth peer, a second global counter associated with a second global counter snapshot, the first peer updating the second global counter snapshot with the second global counter, and storing the updated second global counter snapshot in the local storage.

8. The method of claim 1, wherein the second mapping is distributed to the second set of peers.

9. A non-transitory computer-readable storage medium storing instructions which, when executed by one or more processors, cause the one or more processors to perform:
establishing a first mapping between request attribute sets and a first set of peers in a network;
wherein the peer to which each request attribute set is assigned is responsible for aggregating counter information associated with requests associated with the each request attribute set;
receiving, at a first peer in the first set of peers, a first request associated with a first request attribute set;
wherein the first mapping maps the first request attribute set to a second peer, in the first set of peers;
based, at least in part, on determining that the first request is associated with the first attribute set, the first peer retrieving a first global counter snapshot and a first local increment counter from local storage associated with the first peer;
based, at least in part, on the first global counter snapshot, the first local increment counter and policy information, the first peer determining whether the first peer can service the first request;
in response to determining that the first peer can service the first request:
    the first peer servicing the first request; and
    the first peer incrementing the first local increment counter to reflect that the first peer serviced the first request.

10. The non-transitory computer-readable storage medium of claim 9, wherein the instructions include instructions for:
determining whether the first local increment counter exceeded a threshold value;
in response to determining that the first local increment counter exceeded the threshold value, transmitting the first local increment counter to the second peer, and resetting the first local increment counter to zero; and
in response to the first peer receiving, from the second peer, a first global counter associated with the first global counter snapshot, the first peer updating the first global counter snapshot with the first global counter, and storing the updated first local counter in the local storage.

11. The non-transitory computer-readable storage medium of claim 9, wherein:
the first mapping maps a second identifier to the first peer; and
further comprising instructions which, when executed, cause the one or more processors to perform:
receiving update data for one or more local counters snapshots from other peers in the set of peers; and
based on the update data received from the other peers, updating the one or more local counters snapshots.

12. The non-transitory computer-readable storage medium of claim 9,
wherein the first request comprises the first identifier, which identifies a first requestor that sent the first request; and
wherein the first mapping comprises one or more partitions, and each partition, from the one or more partitions, corresponds to a peer from the set of peers.

13. The non-transitory computer-readable storage medium of claim 9, further comprising instructions which, when executed, cause the one or more processors to perform:
in response to detecting that a third peer is installed in the network:
modifying the first mapping to represent a new mapping between the identifiers and a new set of peers;
wherein the new set of peers comprises the set of peers and the third peer; and
using the new mapping to determine a particular peer to which transmit updates for the first global counter.

14. The non-transitory computer-readable storage medium of claim 9, further comprising instructions which, when executed, cause the one or more processors to perform:
determining whether the first requestor required provisioning for services offered by the network;
wherein the provisioning of the first requestor comprises determining, for the first requestor, one or more quotas associated with the one or more classifiers; and
wherein the determining whether the first peer can service the first request further comprises determining whether servicing the first request by the first peer could cause exceeding any of the one or more quotas associated with the one or more classifiers for the first requestor.

15. The non-transitory computer-readable storage medium of claim 9 further comprising instructions which, when executed, cause the one or more processors to perform:
establishing a second mapping between the identifiers and a second set of peers in the network;
wherein the second set of peers comprises the peers of the first set of peers except the second peer;
detecting that the second peer is non-responsive;
receiving, at the first peer, a second request associated with the first identifier and the one or more classifiers;
based, at least in part, on the first identifier, the one or more classifiers, and the policy information, the first peer retrieving the first global counter snapshot and the first local increment counter;
based, at least in part, on the first global counter snapshot and the first local increment counter, the first peer determining whether the first peer can service the second request;
in response to determining that the first peer can service the second request:
the first peer servicing the second request;
the first peer updating the first local increment counter to reflect that the first peer serviced the first request;
based on the second mapping, the first peer determining that the first local increment counter is to be sent to a fourth peer;
the first peer transmitting the first local increment counter to the fourth peer and resetting the first local increment counter to zero; and
in response to the first peer receiving, from the fourth peer, a second global counter associated with a second global counter snapshot, the first peer updating the second global counter snapshot with the second global counter, and storing the updated second global counter snapshot in the local storage.

16. The non-transitory computer-readable storage medium of claim 9, wherein the second mapping is distributed to the second set of peers.

17. A system comprising a plurality of peers, wherein the plurality of peers comprises a first peer and a second peer, and wherein:
the first peer is configured to perform:
establishing a first mapping between request attribute sets and a first set of peers in a network;
wherein the peer to which each request attribute set is assigned is responsible for aggregating counter information associated with requests associated with the each request attribute set;
receiving, at the first peer in the first set of peers, a first request associated with a first request attribute set;
wherein the first mapping maps the first request attribute set to the second peer, in the first set of peers;
based, at least in part, on determining that the first request is associated with the first attribute set, the first peer retrieving a first global counter snapshot and a first local increment counter from local storage associated with the first peer;
based, at least in part, on the first global counter snapshot, the first local increment counter and policy information, the first peer determining whether the first peer can service the first request;
in response to determining that the first peer can service the first request:
the first peer servicing the first request; and
the first peer incrementing the first local increment counter to reflect that the first peer serviced the first request.

18. The system of claim 17 wherein the first peer is further configured to perform:
determining whether the first local increment counter exceeded a threshold value;
in response to determining that the first local increment counter exceeded the threshold value, transmitting the first local increment counter to the second peer, and resetting the first local increment counter to zero; and
in response to the first peer receiving, from the second peer, a first global counter associated with the first global counter snapshot, the first peer updating the first global counter snapshot with the first global counter, and storing the updated first local counter in the local storage.

19. The system of claim 17,
wherein the first request comprises the first identifier, which identifies a first requestor that sent the first request; and wherein the first mapping comprises one or more partitions, and each partition, from the one or more partitions, corresponds to a peer from the set of peers.

20. The system of claim 17,
wherein the first request comprises the first identifier, which identifies a first requestor that sent the first request; and
wherein the first mapping comprises one or more partitions, and each partition, from the one or more partitions, corresponds to a peer from the set of peers.

21. The system of claim 17, further comprising a third peer; and wherein the first peer is further configured to perform:
in response to detecting that the third peer is installed in the network:
modifying the first mapping to represent a new mapping between the identifiers and a new set of peers;
wherein the new set of peers comprises the set of peers and the third peer; and
using the new mapping to determine a particular peer to which transmit updates for the first global counter.

22. The system of claim 20, wherein the first peer is further configured to:
determining whether the first requestor required provisioning for services offered by the network;
wherein the provisioning of the first requestor comprises determining, for the first requestor, one or more quotas associated with the one or more classifiers; and
wherein the determining whether the first peer can service the first request further comprises determining whether servicing the first request by the first peer could cause exceeding any of the one or more quotas associated with the one or more classifiers for the first requestor.

23. The system of claim 17, further comprising a fourth peer; and wherein the first peer is further configured to perform:
establishing a second mapping between the identifiers and a second set of peers in the network;
wherein the second set of peers comprises the peers of the first set of peers except the second peer;
detecting that the second peer is non-responsive;
receiving, at the first peer, a second request associated with the first identifier and the one or more classifiers;
based, at least in part, on the first identifier, the one or more classifiers, and the policy information, the first peer retrieving the first global counter snapshot and the first local increment counter;
based, at least in part, on the first global counter snapshot and the first local increment counter, the first peer determining whether the first peer can service the second request;
in response to determining that the first peer can service the second request:
the first peer servicing the second request;
the first peer updating the first local increment counter to reflect that the first peer serviced the first request;
based on the second mapping, the first peer determining that the first local increment counter is to be sent to the fourth peer;
the first peer transmitting the first local increment counter to the fourth peer and resetting the first local increment counter to zero; and
in response to the first peer receiving, from the fourth peer, a second global counter associated with a second global counter snapshot, the first peer updating the second global counter snapshot with the second global counter, and storing the updated second global counter snapshot in the local storage.

* * * * *